US012670240B2

(12) United States Patent
Newell et al.

(10) Patent No.: US 12,670,240 B2
(45) Date of Patent: Jun. 30, 2026

(54) BINDING OF MULTIPLE BIOMETRICS

(71) Applicant: iProov Limited, London (GB)

(72) Inventors: Andrew Newell, West Sussex (GB); Joseph A. Palmer, London (GB)

(73) Assignee: iProov Limited, London (GB)

( * ) Notice: Subject to any disclaimer, the term of this patent is extended or adjusted under 35 U.S.C. 154(b) by 169 days.

(21) Appl. No.: 18/797,279

(22) Filed: Aug. 7, 2024

(65) Prior Publication Data

US 2025/0124118 A1      Apr. 17, 2025

Related U.S. Application Data

(60) Provisional application No. 63/590,392, filed on Oct. 13, 2023.

(51) Int. Cl.
*G06F 21/32* (2013.01)
*G06V 40/20* (2022.01)
*G06V 40/70* (2022.01)

(52) U.S. Cl.
CPC .............. *G06F 21/32* (2013.01); *G06V 40/20* (2022.01); *G06V 40/70* (2022.01)

(58) Field of Classification Search
CPC ........ G06F 21/32; G06V 40/20; G06V 40/70; G06V 40/1365; G06V 40/15
See application file for complete search history.

(56) References Cited

U.S. PATENT DOCUMENTS

| | | | | |
|---|---|---|---|---|
| 9,646,261 | B2 * | 5/2017 | Agrafioti ................ | G06V 40/10 |
| 2010/0245553 | A1 * | 9/2010 | Schuler .................. | G06V 40/12 |
| | | | | 382/128 |
| 2014/0188770 | A1 * | 7/2014 | Agrafioti .............. | G06F 21/316 |
| | | | | 706/13 |
| 2016/0191518 | A1 * | 6/2016 | Bud ........................ | G06V 40/20 |
| | | | | 726/7 |
| 2016/0269178 | A1 * | 9/2016 | Yang ................... | H04L 63/0861 |

* cited by examiner

*Primary Examiner* — J. Brant Murphy
(74) *Attorney, Agent, or Firm* — Oliver Strimpel

(57)      ABSTRACT

Certain biometric authentication and verification methods use multiple biometric modalities of a given user in order to enhance their security. Circumvention of such methods sometimes involves presenting multiple biometrics as if they come from a single user when, in fact, they arise from more than one person. To thwart such attacks, it is necessary to bind multiple biometric modalities to each other. One binding method captures physiological signals of a user, such as pulse rate, in conjunction with the capture of each biometric. When the physiological signals associated with each of the biometric modalities match, the biometrics are bound. Another binding method captures an intermediate biometric when capturing each of the multiple biometric modalities. When the intermediate biometrics match, the multiple biometric modalities are bound. For example, for face and finger biometrics, a palm intermediate biometric may be used.

32 Claims, 3 Drawing Sheets

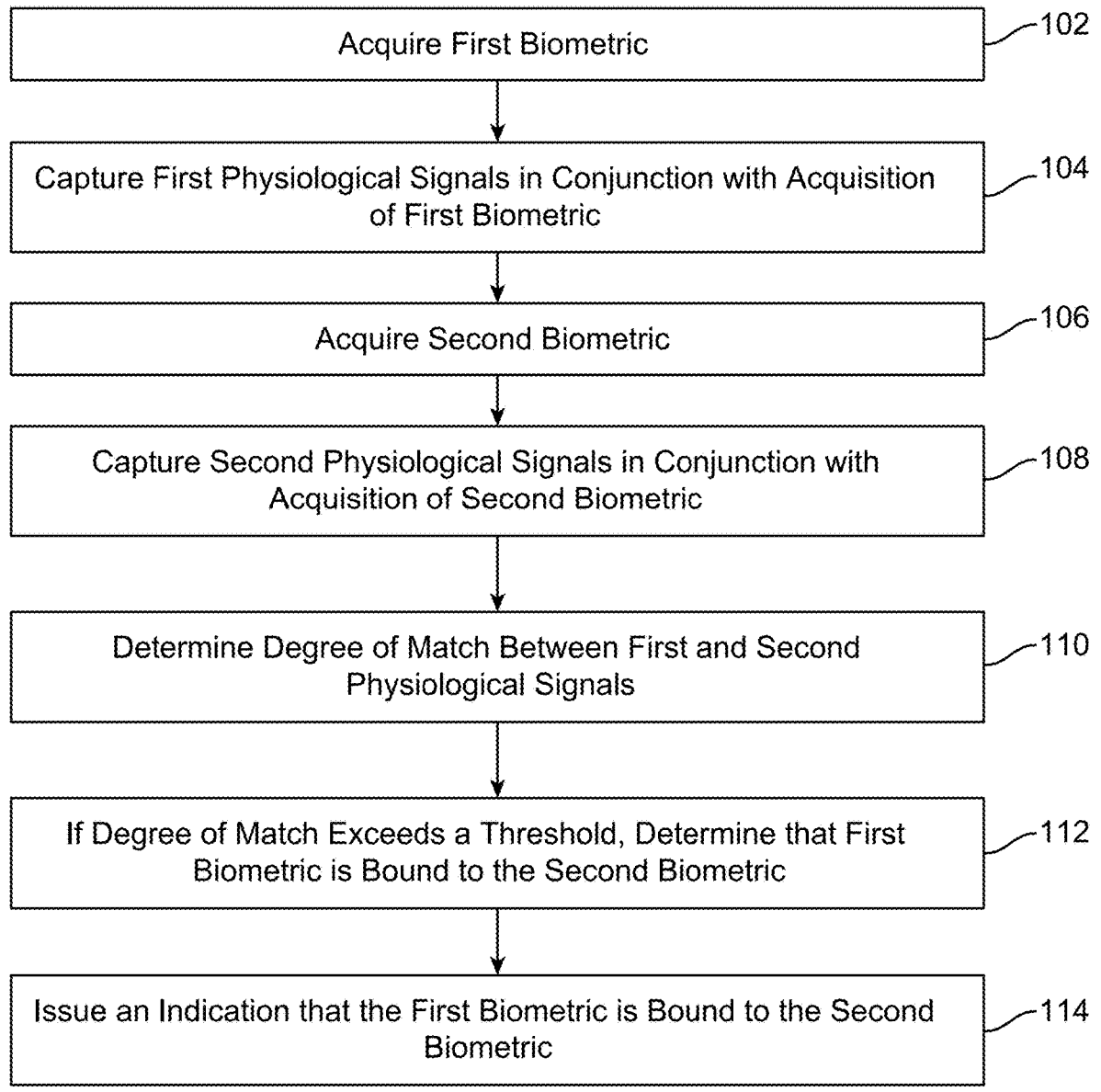

Acquire First Biometric — 102

Capture First Physiological Signals in Conjunction with Acquisition of First Biometric — 104

Acquire Second Biometric — 106

Capture Second Physiological Signals in Conjunction with Acquisition of Second Biometric — 108

Determine Degree of Match Between First and Second Physiological Signals — 110

If Degree of Match Exceeds a Threshold, Determine that First Biometric is Bound to the Second Biometric — 112

Issue an Indication that the First Biometric is Bound to the Second Biometric — 114

FIG. 1

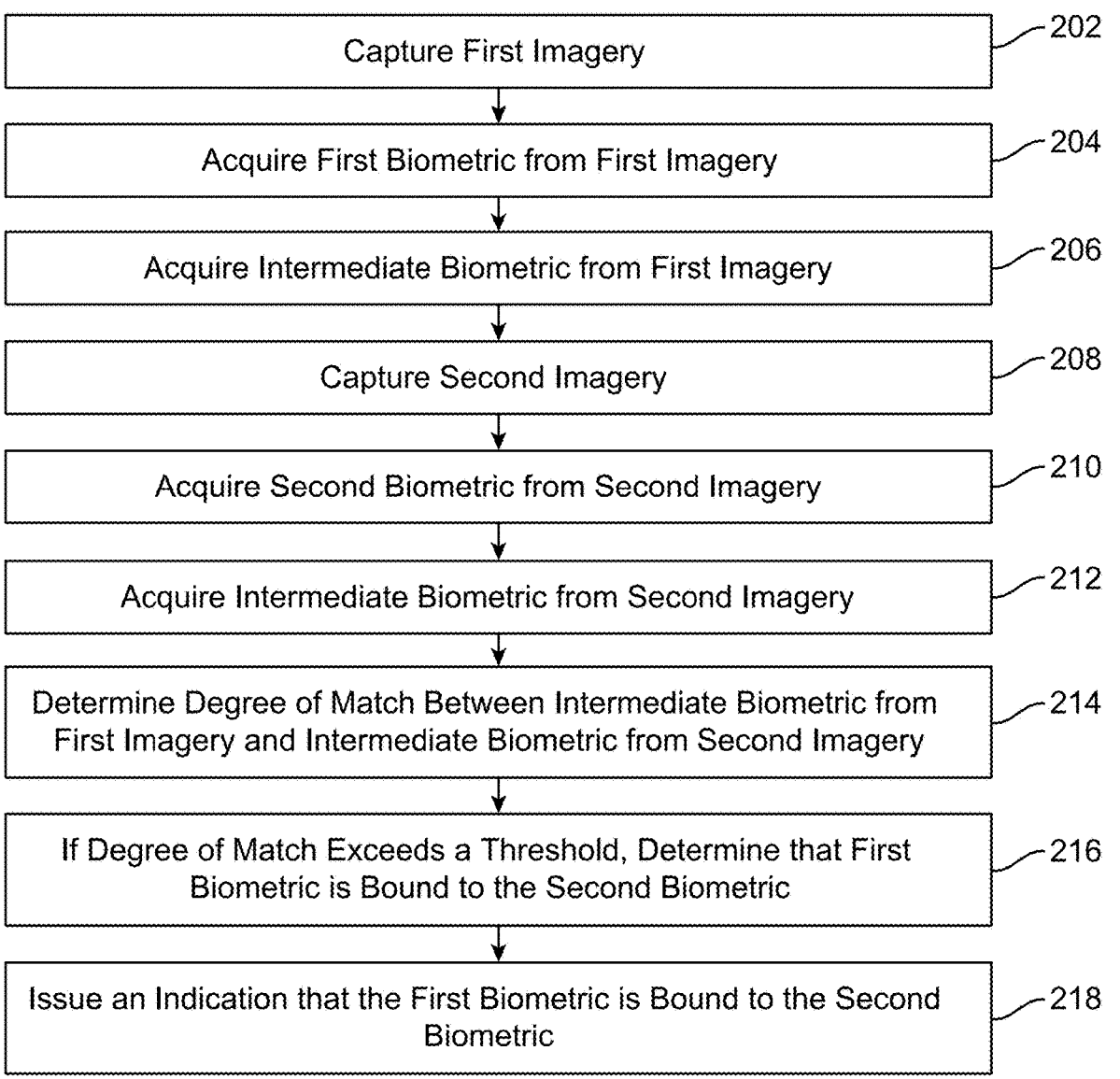

Capture First Imagery ⟋202

Acquire First Biometric from First Imagery ⟋204

Acquire Intermediate Biometric from First Imagery ⟋206

Capture Second Imagery ⟋208

Acquire Second Biometric from Second Imagery ⟋210

Acquire Intermediate Biometric from Second Imagery ⟋212

Determine Degree of Match Between Intermediate Biometric from First Imagery and Intermediate Biometric from Second Imagery ⟋214

If Degree of Match Exceeds a Threshold, Determine that First Biometric is Bound to the Second Biometric ⟋216

Issue an Indication that the First Biometric is Bound to the Second Biometric ⟋218

FIG. 2

BINDING OF MULTIPLE BIOMETRICS

CROSS REFERENCE TO RELATED APPLICATION

This application claims right of priority to and the benefit under 35 U.S.C. Section 119 (e) of U.S. provisional patent application Ser. No. 63/590,392, filed on Oct. 13, 2023.

BACKGROUND

Biometric authentication methods often deploy more than one type of biometric when used as part of security systems. For example, they can help to increase the security and versatility of user authentication as well as to perform checks against security-related databases such as watchlists. Such methods need to ensure that each of the biometric types that are involved originates from the same physical person, a problem which is known as binding. For example, if authentication makes use of face and fingerprint biometrics, when the biometrics are enrolled it is essential to understand that the face that is captured comes from the same physical person as the fingerprints that are captured. In certain circumstances, bad actors may seek to thwart such authentication systems by enrolling biometrics from different people. For example, certain border-crossing control methods require the capture of both face and fingerprint prior to travel, but only use fingerprints to perform necessary checks against watchlists for entry. If a user believes they are on a watchlist they may try to enroll their face along with a fingerprint from another physical person. They may then be able to use their own face to cross the border, while the fingerprint fraudulently associated with their face evades the watch list.

SUMMARY

Existing methods of binding rely on supervised capture of biometrics, which is impractical in most online use cases and is labor-intensive and therefore costly. There is therefore a need for methods and systems that bind one biometric modality to another in order to prevent an individual from enrolling a biometric modality arising from another person.

In general, the described methods and systems enable a determination that biometrics of different modalities arise from the same person, thus binding them together. The methods include the use of physiological signals and intermediate biometrics.

In general, in a first aspect, a method of binding a first biometric to a second biometric comprises: acquiring the first biometric; capturing first physiological signals in conjunction with acquisition of the first biometric; acquiring the second biometric; capturing second physiological signals in conjunction with acquisition of the second biometric; comparing the first and second physiological signals to determine a degree of match between the first and second physiological signals; and when the degree of match between the first and second physiological signals exceeds a threshold degree of match, making a first determination that the first biometric is bound to the second.

Various embodiments include one or more of the following features. The physiological signals arise from cardiac activity. The physiological signals are indicative of a pulse rate. The physiological signals are obtained by analyzing captured video of a user. The first biometric is a face and the second biometric is a fingerprint. One of the first and second biometrics is one of a palm print, a palm vein, a hand shape, an ear shape, a periocular region, and a voice. The physiological signal has two spatial dimensions. The first biometric is acquired from captured first imagery and the second biometric is acquired from captured second imagery, further comprising: acquiring an intermediate biometric from the captured first imagery; acquiring an intermediate biometric from the captured second imagery; comparing the intermediate biometric acquired from the first imagery with the intermediate biometric acquired from the second imagery to determine a degree of match between the intermediate biometric acquired from the first imagery and the intermediate biometric acquired from the second imagery; when the degree of match between the intermediate biometric acquired from the first imagery and the intermediate biometric acquired from the second imagery exceeds a threshold degree of match: making a second determination that the first biometric of the user is bound to the second biometric; and wherein the indication that the first biometric is bound to the second biometric is based in part on the second determination. Measuring at least one of a relative orientation, position, and size of each of the first and second biometrics; and when the measured at least one of the relative orientation, position, and size of each of the first and second biometrics is assessed to be consistent with the first and second biometrics arising from a single person: making a second determination that the first biometric is bound to the second biometric; and wherein the indication that the first biometric is bound to the second biometric is based in part on the second determination. The first and second biometrics are acquired from video imagery and further comprising: using the video imagery to determine a motion of at least one of the first and second biometrics; and when the motion is assessed to be consistent with the first and second biometrics arising from a single person: making a second determination that the first biometric is bound to the second biometric; and wherein the indication that the first biometric is bound to the second biometric is based in part on the second determination.

In general, in another aspect, a method of binding a first biometric to a second biometric comprises: capturing first imagery; acquiring a first biometric from the first imagery; acquiring an intermediate biometric from the first imagery; capturing second imagery; acquiring an intermediate biometric from the second imagery; comparing the intermediate biometric acquired from the first imagery with the intermediate biometric acquired from the second imagery to determine a degree of match between the intermediate biometric acquired from the first imagery and the intermediate biometric acquired from the second imagery; when the degree of match between the intermediate biometric acquired from the first imagery and the intermediate biometric acquired from the second imagery exceeds a threshold degree of match: making a first determination that the first biometric of the user is bound to the second biometric; and issuing an indication that the first biometric of the user is bound to the second biometric.

Various embodiments include one or more of the following features. The first biometric is a the first biometric is a face, the second biometric is a fingerprint, and the intermediate biometric is a palm. Capturing first physiological signals in conjunction with acquisition of the first biometric; capturing second physiological signals in conjunction with acquisition of the second biometric; comparing the first and second physiological signals to determine a degree of match between the first and second physiological signals; when the degree of match between the first and second physiological signals exceeds a threshold degree of match: making a second determination that the first biometric is bound to the second biometric; and wherein the indication that the first biometric is bound to the second biometric is based in part on the second determination. Measuring at least one of a relative orientation, relative position, and relative size of each of the first biometric and the intermediate biometric; when the at least one of a relative orientation, relative position, and relative size of each of the first biometric and the intermediate biometric are assessed to be consistent with the first and intermediate biometrics arising from a single person: making a determination that the first biometric is bound to the intermediate biometric; and wherein the indication that the first biometric is bound to the second biometric is based in part on the determination that the first biometric is bound to the intermediate biometric. Measuring at least one of a relative orientation, relative position, and relative size of each of the first biometric and the second biometric; when the at least one of a relative orientation, relative position, and relative size of each of the first biometric and the second biometric are assessed to be consistent with the first and intermediate biometrics arising from a single person: making a second determination that the first biometric is bound to the second biometric; and wherein the indication that the first biometric is bound to the second biometric is based in part on the second determination. The first and intermediate biometrics are acquired from video imagery and further comprising: using the video imagery to determine a motion of at least one of the first and intermediate biometrics; and when the motion is assessed to be consistent with the first and intermediate biometrics arising from a single person: making a second determination that the first biometric is bound to the second biometric; and wherein the indication that the first biometric is bound to the second biometric is based in part on the second determination.

In general, in a further aspect, a method of binding a first biometric to a second biometric comprises: capturing first imagery; acquiring a first biometric from the first imagery; acquiring a third biometric from the first imagery; capturing second imagery; acquiring a second biometric from the second imagery; acquiring the third biometric from the second imagery; comparing the third biometric acquired from the first imagery with the third biometric acquired from the second imagery to determine a degree of match between the third biometric acquired from the first imagery and the third biometric acquired from the second imagery; and when the degree of match between the third biometric acquired from the first imagery and the third biometric acquired from the second imagery exceeds a threshold degree of match: determining that the first biometric of the user is bound to the second biometric; and issuing an indication that the first biometric of the user is bound to the second biometric.

Various embodiments include one or more of the following features. The third biometric is a biometric that is intermediate in scale between the first biometric and the second biometric. The first biometric is a face, the second biometric is a fingerprint, and the third biometric is palm. One of the first and second biometrics is one of a palm print, a palm vein, a hand shape, an ear shape, a periocular region, and a voice. The first and third biometrics are captured simultaneously and the second and third biometrics are captured simultaneously. The first and third biometrics are captured at a first time and the second and third biometrics are captured at a second time. A time interval between the first time and the second time is greater than one year. A time interval between the first time and the second time is between one hour and one year. A time interval between the first time and the second time is less than one hour. The third biometric is a physiological signal. The physiological signal is one of a pulse and an EKG. Measuring at least one of a relative orientation, position, and size of each of the first and third biometrics; and when the measured at least one of the relative orientation, position, and size of each of the first and third biometrics is assessed to be consistent with the first and third biometrics arising from a single person: making a determination that the first biometric is bound to the third biometric; and wherein the indication that the first biometric is bound to the second biometric is based in part on the determination that the first biometric is bound to the third biometric.

In general, in another aspect, a computer program product comprises: a non-transitory computer-readable medium with computer-readable instructions encoded thereon, wherein the computer-readable instructions, when processed by a processing device instruct the processing device to perform a method of binding a first biometric to a second biometric, the method comprising: acquiring the first biometric; capturing first physiological signals in conjunction with acquisition of the first biometric; acquiring the second biometric; capturing second physiological signals in conjunction with acquisition of the second biometric; comparing the first and second physiological signals to determine a degree of match between the first and second physiological signals; and when the degree of match between the first and second physiological signals exceeds a threshold degree of match: making a first determination that the first biometric is bound to the second biometric; and issuing an indication that the first biometric is bound to the second biometric.

In general, in another aspect, a computer program product comprises: a non-transitory computer-readable medium with computer-readable instructions encoded thereon, wherein the computer-readable instructions, when processed by a processing device instruct the processing device to perform a method of binding a first biometric to a second biometric, the method comprising: capturing first imagery; acquiring a first biometric from the first imagery; acquiring an intermediate biometric from the first imagery; capturing second imagery; acquiring an intermediate biometric from the second imagery; comparing the intermediate biometric acquired from the first imagery with the intermediate biometric acquired from the second imagery to determine a degree of match between the intermediate biometric acquired from the first imagery and the intermediate biometric acquired from the second imagery; and when the degree of match between the intermediate biometric acquired from the first imagery and the intermediate biometric acquired from the second imagery exceeds a threshold degree of match: making a first determination that the first biometric of the user is bound to the second biometric; and issuing an indication that the first biometric of the user is bound to the second biometric.

In general, in another aspect, a system comprises: a memory for storing computer-readable instructions; and a processor connected to the memory, wherein the processor, when executing the computer-readable instructions, causes the system to perform a method of binding a first biometric to a second biometric, the method comprising: acquiring the first biometric; capturing first physiological signals in conjunction with acquisition of the first biometric; acquiring the second biometric; capturing second physiological signals in conjunction with acquisition of the second biometric; comparing the first and second physiological signals to determine a degree of match between the first and second physiological signals; and when the degree of match between the first and second physiological signals exceeds a threshold degree of match: making a first determination that the first biometric is bound to the second biometric; and issuing an indication that the first biometric is bound to the second biometric.

In general, in another aspect, a system comprises: a memory for storing computer-readable instructions; and a processor connected to the memory, wherein the processor, when executing the computer-readable instructions, causes the system to perform a method of binding a first biometric to a second biometric, the method comprising: capturing first imagery;

acquiring a first biometric from the first imagery; acquiring an intermediate biometric from the first imagery; capturing second imagery; acquiring an intermediate biometric from the second imagery; comparing the intermediate biometric acquired from the first imagery with the intermediate biometric acquired from the second imagery to determine a degree of match between the intermediate biometric acquired from the first imagery and the intermediate biometric acquired from the second imagery; and when the degree of match between the intermediate biometric acquired from the first imagery and the intermediate biometric acquired from the second imagery exceeds a threshold degree of match: making a first determination that the first biometric of the user is bound to the second biometric; and issuing an indication that the first biometric of the user is bound to the second biometric.

BRIEF DESCRIPTION OF THE DRAWINGS

FIG. 1 is a high-level flow diagram showing the steps involved in binding two different biometric modalities using physiological signals.

FIG. 2 is a high-level flow diagram showing the steps involved in binding two different biometric modalities using simultaneous presentation of an intermediate biometric.

DETAILED DESCRIPTION

Figure 3:
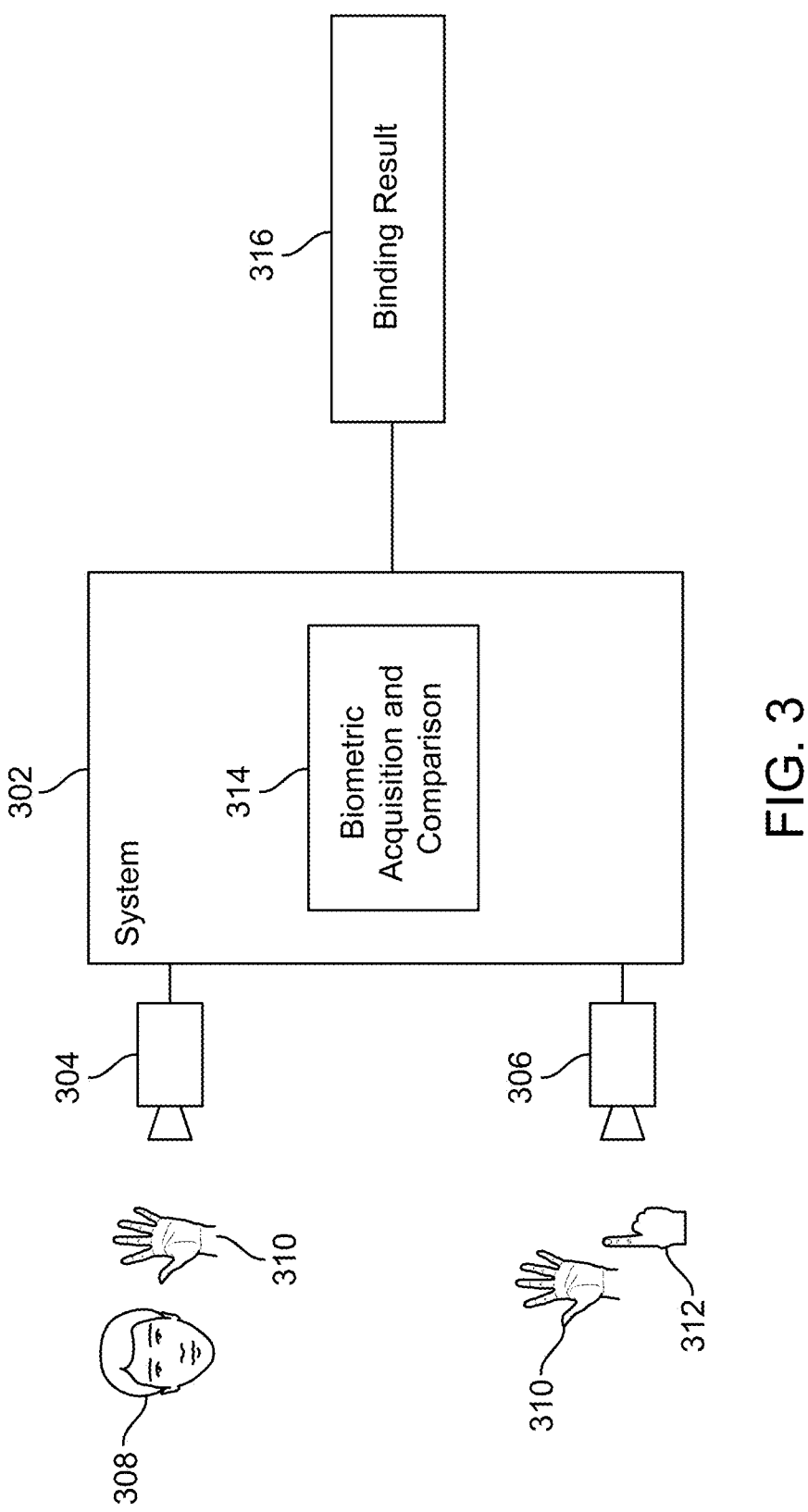
FIG. 3 is a high-level block diagram of a system for binding two biometrics together using an intermediate biometric.

Certain authentication or verification systems may require the use of multiple biometric modalities. This may make a system more secure since, if a secure process is established for each biometric modality, then combining the two in a certain way creates a more secure system. For example, a system may require the enrollment of both face and fingerprint, both of which are then required at the point of authentication or verification. Some systems may allow users to choose the mode of authentication or verification. For example, if a user is enrolled with multiple biometrics, they may choose one of the biometrics at the point of verification that provides the greatest convenience. Using the face and fingerprint example again, if both of these are enrolled, the user may be allowed to choose, for each authentication or verification, whether to present their face or fingerprint. In some contexts, a verification system needs more than one biometric modality to be checked against existing biometric datasets. For example, a system for biometric control of a jurisdiction's border may require the acquisition of both face and fingerprint biometrics.

As used herein, the term "verification" is used when an external identity is being verified, as, for example, when verifying an individual in reference to a government-issued identity document. "Authentication" is used when a person is already enrolled as a user and they are being authenticated against that enrollment. The two processes may be combined, as occurs, for example, when a user is verified against a passport and then offered ongoing authentication with respect to the passport.

In all the cases described above, it is essential to ensure that the multiple biometrics captured arise from the same physical being. In certain use cases, there may be a significant incentive to attempt to enroll biometrics from different physical beings. For example, when a system allows users to choose the mode of verification, two different people may wish to enroll one biometric modality each, allowing them both to access a single user account. In another context, as mentioned in the border-crossing case mentioned above, when biometric modalities are checked against an existing database, if a particular user wants to avoid having their fingerprint matched against a particular dataset, they may attempt to enroll their face alongside the fingerprint of a different person.

Ensuring that multiple biometric modalities arise from the same physical being is challenging as each biometric modality may require different hardware for acquisition. For example, fingerprints may be captured through a specific sensor designed for fingerprint capture whereas face biometrics may be captured through an RGN camera. Alternatively, multiple biometrics may be captured using a single sensor but using different settings. For example, face and fingerprint biometrics may both be captured using an RGB camera but the camera settings, such as the focus and exposure, may be different for each.

Methods and systems that address the problem of binding biometrics of different modalities to each other are described herein. One method of addressing the binding problem uses a physiological signal of a person being verified or authenticated that can be acquired by one or more sensors of a biometric authentication system. If two biometrics come from the same individual, they should each be associated with a common physiological signal. The physiological signal chosen for this purpose has characteristics that vary from one individual to another. Examples of suitable physiological signals include: the pulse rate and other biological signals arising from blood flow; patterns arising from cardiac activity that are visible in an ECG; small motions affecting biometrics that arise from respiration patterns; micromotion in the face arising from speech or emotional changes; corresponding vocal changes which arise from the same cause as the micromotion; motion of the eye, including changes in the gaze and pupil characteristics; and micromotion of the hand.

The implementations described below refer to acquisition of biometrics from various forms of imagery captured using various sensors. Imagery may include any array of values having a spatial element, i.e., that reflect the spatial variation of a property in an object from which reflected, refracted, or emitted radiation is received by the sensors. For RGB, RGN, and thermal infrared cameras, raster images of the values of red, green, blue, near-infrared, and thermal infrared are captured. For special-purpose sensors, such as fingerprint or blood flow sensors, the captured data may not be in the form of a conventional image with two or three spatial dimensions. Three-dimensional scanners may be used to capture biometric information, including, in some cases, micromotion arising from breathing patterns, which may be used as a physiological signal for binding purposes, as described below. More generally, two or three-dimensional data representing biometric information may be viewed as an image.

For example, a voice signal may be bound to a face using physiological signals that arise from voice-related motion. This may be accomplished by recording video of the face, extracting features from the audio to detect certain key features, which may then temporally correlate with motion extracted from the video. Here, a 1-dimensional signal (voice) measuring amplitude over time is compared with a 2-dimensional signal (the facial image), which varies over time, with both sets of extracted features being temporal.

In general, biometric modalities may be captured using both specific and general-purpose hardware. In the example given above, a fingerprint biometric may be captured using a specific fingerprint reader along with a face biometric captured using an RGB camera. The acquisition of a biometric may involve processing on the user device, such as a mobile phone, or processing on a server in data communication with a mobile phone, or processing on a combination of the two.

One method of addressing the binding problem uses a physiological signal of a person being verified or authenticated that can be acquired by one or more sensors of a biometric authentication system. If two biometrics come from the same individual, they should each be associated with a common physiological signal. The physiological signal chosen for this purpose has characteristics that vary from one individual to another. Examples of suitable physiological signals include: the pulse rate and other biological signals arising from blood flow; patterns arising from cardiac activity that are visible in an ECG; small motions affecting biometrics that arise from respiration patterns; micromotion in the face arising from speech or emotional changes; corresponding vocal changes which arise from the same cause as the micromotion; motion of the eye, including changes in the gaze and pupil characteristics; and micromotion of the hand.

FIG. 1 is a high-level flow diagram showing the steps involved in binding two different biometric modalities using physiological signals. In step 102, the first biometric is acquired. An example of a first biometric is a face captured using a camera, such as a camera of a mobile device. In step 104, in conjunction with the acquisition of the first biometric, physiological signals are acquired using either the same sensor or a different sensor. For example, a pulse may be determined from video of facial imagery using either the same camera used to capture the face biometric (e.g., an RGB camera) or a different sensor adapted to the purpose. An example of a device suitable for pulse-rate capture is a camera sensitive to the near infrared or thermal infrared, which may detect pulse more effectively from biometrics other than the face, such those derived from the hand. Techniques for pulse determination from video imagery are well known as described, for example, in "Real Time Heart Rate Monitoring From Facial RGB Color Video Using Webcam," by Rahman, H., et al. (2016), The 29th Annual Workshop of the Swedish Artificial Intelligence Society, ed. Davidsson, P., pp. 15-22, which is wholly incorporated herein by reference. Pulse detection may be performed simultaneously with presentation of an associated biometric, or by presentation within a short time period. Simultaneous capture may be implemented by using both front and rear cameras on a mobile phone. For example, the user holds their phone and looks at the screen while holding their hand in front of the back camera. The front camera captures the face, and the back camera captures the palm or fingerprint. For consecutive capture, a suitable gap length is determined by the extent to which the physiological symbol is transient. For example, when capturing traits from the blood flow, a time lag of about a minute generally produces consistent signals, but an interval of an hour, during which the user may have exercised or relaxed, may produce different traits, though the signals may still be usable for binding purposes depending on the level of assurance required for a particular use case.

In step 106, a second biometric is acquired. An example of a second biometric is a fingerprint, which may be captured using the same camera used for capturing the face or using a different camera. In step 108, a second set of physiological signals is captured in conjunction with acquisition of the second biometric. In general, the same type of physiological signal is captured in conjunction with both biometrics to help facilitate the matching process. In a typical use case, the same method of acquiring the physiological signal is used in conjunction with capturing each of the two biometrics that are to be bound. However, in some cases, the same underlying physiological signal may be captured in different ways as long as the captured signals arise from the same physiological cause. In the example described, a pulse is estimated in conjunction with acquiring the fingerprint. This may be captured using a camera (e.g., RGB, RGN, thermal IR) or from an ECG process, both of which capture traits that arise from the same physical cause, i.e., in this case, the activity of the heart.

Biometrics that may be bound by using physiological signals include palmprints, palm veins, hand shapes, car shapes, periocular regions, and voice.

Certain physiological signals may provide a biometric, in that they may facilitate the identification of an individual, but in other circumstances they may provide information that is not classed as a biometric. For example, a detailed signal that comes from heart activity (such as ECG) may be classed as a biometric, but measurements such as pulse rate do not constitute a biometric. Thus, certain physiological signals may constitute biometrics that may be used for binding purposes, even though they do not take the form of two or three-dimensional imagery that characterizes body part biometrics such as the face, palm, or finger.

In certain implementations, physiological signals may have more than one dimension. For example, blood flow in a hand is a complex two-dimensional signal that may be captured by a near-infrared or thermal infrared camera. Such multi-dimensional physiological signals may be bound to a spatial biometric. For example, the spatial structure of veins in a hand may provide information that can be used to bind hand shape to fingerprint.

In step 110, the two sets of physiological signals, e.g., pulse sequences, are compared to determine the degree to which they match each other. This may be done using machine-learning-based methods, which are used to extract features from the raw physiological signals. In step 112, if the degree of match determined in step 110 exceeds a threshold degree of match, the authentication system makes a determination that the first biometric is bound to the second biometric, i.e., that they both arise from the same physical person. In the example described, when the two measurements of pulse match each other, the acquired face and acquired fingerprint are deemed to belong to the same person. The threshold degree of match may be adaptively adjusted, based on a number of factors including the reliability of the physiological signal extracted, the time between the capture of the samples, the sensor used to capture the signals, and the use case. In various implementations, the matching process comprises a machine learning model that produces a score, and the threshold may then be selected differently for each deployment. In step 114, if the degree of match exceeds the threshold, an indication that the first and second biometrics are bound is issued and may be used to determine a subsequent course of action, such as permitting a person to cross a border, make an online purchase, or have access to a secure space.

Physiological signals may be used to bind more than two biometrics. In this case, a different physiological signal or signals may be used for some of the biometric modalities as long as at least one physiological signal can be used to bind each pair of biometrics with the set of biometric modalities.

In some systems, the biometric modalities are captured consecutively using the same or different sensors. When using physiological signals to bind biometrics, the time interval between consecutive capture is short enough such that traits may be reliably extracted that are sufficiently consistent as to be effective in determining that they arise from the same individual. This varies from trait to trait and by extraction method. For example, a high-resolution ECG may be sufficient to match an individual across long periods of time, such as days, weeks, or even years. In many practical use cases, coarser features are extracted, and these may vary over time intervals of seconds to hours.

When using intermediate biometrics or relatively time-invariant physiological signals, pairs of biometrics may be presented consecutively, e.g., face/palm, then palm/finger-print and they may be captured at different points in time. For example, the face biometric may be captured with distinguishing features of the cardiac activity extracted. At a later point in time the fingerprint biometric can be captured, along with distinguishing features of the cardiac activity, which can then be used to bind to the existing face biometric. In some cases, enrollment of the different biometric modalities may be years apart and a stable physiological signal, such as an electrocardiogram (EKG), can be used to bind them together. In this case, either the EKG was captured at the time of enrollment in preparation for a potential binding event or, when a different biometric modality (e.g., a fin-gerprint) is acquired, the EKG is obtained by analyzing standard RGB video that was recorded at enrollment. In certain practical use cases, the time interval between acqui-sition of the two biometrics to be bound occurs in less than one hour.

Long time intervals up to and including a year or several years between acquisition of different biometric modalities may occur in certain use cases. This situation may arise when a biometric is enrolled and two biometrics are cap-tured simultaneously to allow the potential binding at a later point in time. For example, when using intermediate bio-metrics, face and palmprint may be captured initially, allow-ing for later binding of fingerprint and face without the need to recapture the face biometric, and then palmprint and fingerprint are captured years later. This may involve cap-turing face and palmprint through the RGB camera on a mobile phone and then, at a later point in time, using a special-purpose hardware to capture palmprint and finger-print. This sequence of events is advantageous in transport and retail, where at-home enrollment may only allow the use of RGB devices but specialist hardware can be placed in shops or train stations. In general, it will not be possible to tell in advance when, or if, the person involved will present in person at the station or shop.

Alternatively, the use case may require immediate binding of the biometrics. For example, in the border control case, where it is necessary for the binding of face and fingerprint to occur before any right to cross is granted.

Another method of addressing the binding problem involves the acquisition of an intermediate biometric that appears simultaneously in the same image as a primary biometric that is used for authentication or verification. The intermediate biometric may be intermediate in physical size between the two biometrics sought to be bound. This can then be used to link pairs of biometrics together to form a chain, linking pairs of biometrics for which it may not be possible to ensure simultaneous presentation. For example, in order to bind a face with a fingerprint it may not be possible to rely on simultaneous presentation since the scale of the biometrics differs enough to require different camera settings. However, a face can be simultaneously presented with a palmprint and then a palmprint can be simultaneously presented with a fingerprint. Thus, palmprint matching can be used as an intermediate biometric for binding a face with a fingerprint.

FIG. 2 is a high-level flow diagram showing the steps involved in binding two different biometric modalities using simultaneous presentation of an intermediate biometric. In step 202, the user is asked to present both a first biometric and an intermediate biometric simultaneously to a sensor and imagery that includes both the first biometric and the intermediate biometric are captured. For example, a user may be asked to present their face (first biometric) while holding up their hand to the camera so that their palm (second biometric) is visible. Then the first biometric and the intermediate biometric are acquired from the first imagery in steps 204 and 206 respectively. The spatial scales of face and palm are close enough to permit both biometrics to be acquired from the same imagery. In step 208, the user is asked to present both a second biometric and the interme-diate biometric to one or more sensors simultaneously. The same and/or a different sensor from that used to capture the first imagery is used such that the sensor(s) can resolve detail at spatial scales ranging from that of the second biometric to that of the intermediate biometric. In the example given, the face biometric may be captured with a front-facing camera of a mobile phone while the fingerprint biometric is captured simultaneously using a rear camera of a mobile phone. A fingerprint has a much smaller scale than the face biometric but is close enough to that of the intermediate palm biomet-ric so that both a fingerprint and a palm print can be acquired from the second imagery. Sensors that can capture both a fingerprint and a palmprint include an RGB camera, an RGB camera together with a near-infrared camera, or an RGB camera together with a thermal infrared camera. Alterna-tively, a special-purpose fingerprint-reading device and an RGB camera may be used to capture fingerprint and palm imagery respectively. Devices sensitive to multiple wave-bands (e.g., RGB, RGN) may be used or multiple separate devices may be used to capture the various biometrics involved, such an RGB camera and a separate thermal or near-infrared camera or a fingerprint sensor. Some of these sensors may be internal to a phone, while others, such as a thermal infrared camera, may be external. The second and intermediate biometrics are acquired from the second imag-ery in steps 210 and 212 respectively. In step 214, the degree of match between the intermediate biometric acquired from the first imagery and from the second imagery is determined. The degree of match is determined by estimating the prob-ability that the two samples arise from the same individual physical being versus the probability that they arise from different individuals. Such estimation is based upon statis-tical samples gathered in the development phase when the system gathers data from a set of individuals and or synthetic data, and the match-estimation algorithm is trained using that dataset. In certain implementations, the system is based on machine learning using, for example, a neural-network model.

In step 216, the determined degree of match is compared to a threshold, and if matching exceeds the threshold, the first and second biometrics are determined to be bound. In some systems the biometric modalities are captured consecutively using the same or different sensors. In step 218, if the degree of match exceeds the threshold, an indication that the first and second biometrics are bound is issued and may be used to determine a subsequent course of action, such as permitting a person to cross a border, make an online purchase, or have access to a secure space.

The same approach may be used for a wide range of biometrics including iris, periocular, car, hand shape and gait. For example, to bind iris and face: the face and periocular region are captured using an RGB sensor, and then the periocular region and iris are captured with different camera settings, camera distance from the user, or a different camera lens to capture detail within the iris. Capturing face and iris simultaneously would result in a very low resolution image of the iris but the two step process allows a far greater resolution. In another example, to bind iris and ear shape, the iris and periocular region are captured, the periocular region and face are captured, and the face and car are captured as a three-step process. This may be done as a continuous video stream with the camera zooming out and the user being guided to move the device, thus providing a continuous video stream that starts by focusing on the iris and gradually moves out to focus on the periocular and then the face.

In certain implementations, especially those which may provide a higher level of assurance, the presentation of an intermediate biometric is combined with physiological signals. For example, two biometrics, such as a face and a fingerprint may be bound using an intermediate biometric, such as the palm, while also using pulse rates extracted from the biometrics that are to be bound, and optionally also from the intermediate biometric to provide another indication of binding.

Various implementations include an assessment of the orientation of the presented biometric to ensure that they arise from the same user. For example, when presenting both face and palmprint concurrently, it may still be possible for a person to place their palmprint next to the face of another person. In this case, the relative positions (i.e., proximity) of the biometrics, and optionally the relative size and relative orientations of the biometrics are considered. In this example, some or all of the relative position, size, and orientation of a first biometric (face) and intermediate biometric (palm) are assessed in order to make another estimation as to whether they arise from the same person. When captured imagery includes both a first and a second biometric, with or without an intermediate biometric, similar measurements of the relative position, size, and orientation of the first and second biometrics may be assessed to obtain an estimation (without necessarily involving the intermediate biometric) as to whether they arise from the same person. The indications issued by the system as to whether the first and second biometrics are bound may then depend, at least in part, on the assessments based on relative position, size, and orientation of the biometrics in the captured imagery.

Motion of the biometrics as they are aligned during the acquisition process may also be captured and assessed to determine whether the motion of, for example, the hand corresponds with the expected motion from the hand of the same person. The alignment motion in the video provides a check as to whether the presented hand and palmprint could arise from another person. In one example of the use of alignment motion, the user presents their face while a video is captured. The user is then asked to place their hand next to their face, with the video still being captured. The motion of the hand relative to the face throughout the video stream, or across parts of it, is used to help determine whether the biometrics arise from the same person since, if the hand belongs to the same person as the face, the hand is expected to move throughout the video following a certain arc. In general, though not always, the system attempts to use any traits which can be obtained through the natural experience of a user to help distinguish a bona fide presentation from a fraudulent one.

When two biometrics have been bound to each other, the system may issue an indication to this effect. This may be received by a biometric authentication and verification system, which may then enable a user to receive certain permissions or perform certain actions. For example, one or both of the bound biometrics may be further bound to a digital identity, allowing the assertion and verification of that digital identity for access to a range of services, physical premises, or products. Other examples of actions consequent upon the binding of two biometrics include permission to travel involving a border crossing, the use of one or more biometrics in payment systems, and the use of one or more biometrics for physical access.

FIG. 3 is a high-level block diagram of a system for binding two biometrics together using an intermediate biometric. System 302 receives input from sensors 304 and 306. In various implementations the sensors are external to the system (as shown) or internal, as is the case for smartphone cameras or smartphone fingerprint readers. First biometric 308 and intermediate biometric 310 are presented to sensor 304 and second biometric 312 and intermediate biometric 310 are presented to sensor 306. System 302 acquires biometrics 308 and 310 from sensor 304 and biometrics 310 and 312 from sensor 306. In certain embodiments, sensors 304 and 306 are combined into a single device, which may be used with different settings (e.g., aperture, focus, shutter speed) to capture biometrics 308 and 310 (first settings) and biometrics 310 and 312 (second settings). System 302 includes software 314, which is configured to process the imagery or other data acquired from the sensors and the biometrics, extract the biometrics, compare them, and issue determination 316 as to whether biometrics 308 and 312 are bound, optionally together with a degree of confidence associated with the determination. In various implementations, some or all of the functions of software module 314 are performed by hardware or are performed by a combination of hardware and software of local system 302 and a remote server (not shown) in data communication with system 302. In a common use case, system 302 is a smartphone, and one or both of sensors 304 and 306 are built into the smartphone.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of binding a first biometric to a second biometric, the method comprising:
acquiring the first biometric;
capturing first physiological signals in conjunction with acquisition of the first biometric;
acquiring the second biometric;
capturing second physiological signals in conjunction with acquisition of the second biometric;
comparing the first physiological signals and the second physiological signals to determine a degree of match between the first physiological signals and the second physiological signals; and
when the degree of match between the first physiological signals and the second physiological signals exceeds a threshold degree of match, making a first determination that the first biometric is bound to the second biometric; and
issuing an indication that the first biometric is bound to the second biometric.

2. The method of claim 1, wherein the physiological signals arise from cardiac activity.

3. The method of claim 1, wherein the physiological signals are indicative of a pulse rate.

4. The method of claim 1, wherein the physiological signals are obtained by analyzing captured video of a user.

5. The method of claim 1, wherein the first biometric is a face and the second biometric is a fingerprint.

6. The method of claim 1, wherein one of the first and second biometrics is one of a palm print, a palm vein, a hand shape, an ear shape, a periocular region, and a voice.

7. The method of claim 1, wherein the physiological signal has two spatial dimensions.

8. The method of claim 1, wherein the first biometric is acquired from captured first imagery and the second biometric is acquired from captured second imagery, further comprising:
acquiring an intermediate biometric from the captured first imagery;
acquiring an intermediate biometric from the captured second imagery;
comparing the intermediate biometric acquired from the first imagery with the intermediate biometric acquired from the second imagery to determine a degree of match between the intermediate biometric acquired from the first imagery and the intermediate biometric acquired from the second imagery;
when the degree of match between the intermediate biometric acquired from the first imagery and the intermediate biometric acquired from the second imagery exceeds a threshold degree of match:
making a second determination that the first biometric is bound to the second biometric; and
wherein the indication that the first biometric is bound to the second biometric is based in part on the second determination.

9. The method of claim 1, further comprising:
measuring at least one of a relative orientation, position, and size of each of the first and second biometrics; and
when the measured at least one of the relative orientation, position, and size of each of the first and second biometrics is assessed to be consistent with the first and second biometrics arising from a single person:

making a second determination that the first biometric is bound to the second biometric; and wherein the indication that the first biometric is bound to the second biometric is based in part on the second determination.

10. The method of claim 1 wherein the first and second biometrics are acquired from video imagery and further comprising:

using the video imagery to determine a motion of at least one of the first and second biometrics; and when the motion is assessed to be consistent with the first and second biometrics arising from a single person:

making a second determination that the first biometric is bound to the second biometric; and wherein the indication that the first biometric is bound to the second biometric is based in part on the second determination.

11. A method of binding a first biometric to a second biometric, the method comprising:

capturing first imagery;

acquiring a first biometric from the first imagery;

acquiring an intermediate biometric from the first imagery;

capturing second imagery;

acquiring an intermediate biometric from the second imagery;

comparing the intermediate biometric acquired from the first imagery with the intermediate biometric acquired from the second imagery to determine a degree of match between the intermediate biometric acquired from the first imagery and the intermediate biometric acquired from the second imagery;

when the degree of match between the intermediate biometric acquired from the first imagery and the intermediate biometric acquired from the second imagery exceeds a threshold degree of match:

making a first determination that the first biometric is bound to the second biometric; and issuing an indication that the first biometric is bound to the second biometric.

12. The method of claim 11, wherein the first biometric is a face, the second biometric is a fingerprint, and the intermediate biometric is a palm.

13. The method of claim 11, further comprising:

capturing first physiological signals in conjunction with acquisition of the first biometric;

capturing second physiological signals in conjunction with acquisition of the second biometric;

comparing the first physiological signals and the second physiological signals to determine a degree of match between the first physiological signals and the second physiological signals;

when the degree of match between the first physiological signals and the second physiological signals exceeds a threshold degree of match:

making a second determination that the first biometric is bound to the second biometric; and wherein the indication that the first biometric is bound to the second biometric is based in part on the second determination.

14. The method of claim 11, further comprising:

measuring at least one of a relative orientation, relative position, and relative size of each of the first biometric and the intermediate biometric;

when the at least one of a relative orientation, relative position, and relative size of each of the first biometric and the intermediate biometric are assessed to be consistent with the first and intermediate biometrics arising from a single person:

making a determination that the first biometric is bound to the intermediate biometric; and wherein the indication that the first biometric is bound to the second biometric is based in part on the determination that the first biometric is bound to the intermediate biometric.

15. The method of claim 11, further comprising:

measuring at least one of a relative orientation, relative position, and relative size of each of the first biometric and the second biometric;

when the at least one of a relative orientation, relative position, and relative size of each of the first biometric and the second biometric are assessed to be consistent with the first and intermediate biometrics arising from a single person:

making a second determination that the first biometric is bound to the second biometric; and wherein the indication that the first biometric is bound to the second biometric is based in part on the second determination.

16. The method of claim 11 wherein the first and intermediate biometrics are acquired from video imagery and further comprising:

using the video imagery to determine a motion of at least one of the first and intermediate biometrics; and when the motion is assessed to be consistent with the first and intermediate biometrics arising from a single person:

making a second determination that the first biometric is bound to the second biometric; and wherein the indication that the first biometric is bound to the second biometric is based in part on the second determination.

17. A method of binding a first biometric to a second biometric, the method comprising:

capturing first imagery;

acquiring a first biometric from the first imagery;

acquiring a third biometric from the first imagery;

capturing second imagery;

acquiring a second biometric from the second imagery;

acquiring the third biometric from the second imagery;

comparing the third biometric acquired from the first imagery with the third biometric acquired from the second imagery to determine a degree of match between the third biometric acquired from the first imagery and the third biometric acquired from the second imagery; and when the degree of match between the third biometric acquired from the first imagery and the third biometric acquired from the second imagery exceeds a threshold degree of match:

determining that the first biometric is bound to the second biometric; and issuing an indication that the first biometric is bound to the second biometric.

18. The method of claim 17, wherein the third biometric is a biometric that is intermediate in scale between the first biometric and the second biometric.

19. The method of claim 17, wherein the first biometric is a face, the second biometric is a fingerprint, and the third biometric is palm.

20. The method of claim 17, wherein one of the first and second biometrics is one of a palm print, a palm vein, a hand shape, an ear shape, a periocular region, and a voice.

21. The method of claim 17, wherein the first and third biometrics are captured simultaneously and the second and third biometrics are captured simultaneously.

22. The method of claim 17, wherein the first and third biometrics are captured at a first time and the second and third biometrics are captured at a second time.

23. The method of claim 17, wherein a time interval between the first time and the second time is greater than one year.

24. The method of claim 23, wherein a time interval between the first time and the second time is between one hour and one year.

25. The method of claim 23, wherein a time interval between the first time and the second time is less than one hour.

26. The method of claim 17, wherein the third biometric is a physiological signal.

27. The method of claim 26, wherein the physiological signal is one of a pulse and an EKG.

28. The method of claim 17, further comprising:
measuring at least one of a relative orientation, position, and size of each of the first and third biometrics; and
when the measured at least one of the relative orientation, position, and size of each of the first and third biometrics is assessed to be consistent with the first and third biometrics arising from a single person:
making a determination that the first biometric is bound to the third biometric; and
wherein the indication that the first biometric is bound to the second biometric is based in part on the determination that the first biometric is bound to the third biometric.

29. A computer program product comprising:
a non-transitory computer-readable medium with computer-readable instructions encoded thereon, wherein the computer-readable instructions, when processed by a processing device instruct the processing device to perform a method of binding a first biometric to a second biometric, the method comprising:
acquiring the first biometric;
capturing first physiological signals in conjunction with acquisition of the first biometric;
acquiring the second biometric;
capturing second physiological signals in conjunction with acquisition of the second biometric;
comparing the first physiological signals and the second physiological signals to determine a degree of match between the first physiological signals and the second physiological signals; and
when the degree of match between the first physiological signals and the second physiological signals exceeds a threshold degree of match:
making a first determination that the first biometric is bound to the second biometric; and
issuing an indication that the first biometric is bound to the second biometric.

30. A computer program product comprising:
a non-transitory computer-readable medium with computer-readable instructions encoded thereon, wherein the computer-readable instructions, when processed by a processing device instruct the processing device to perform a method of binding a first biometric to a second biometric, the method comprising:
capturing first imagery;
acquiring a first biometric from the first imagery;
acquiring an intermediate biometric from the first imagery;

capturing second imagery;
acquiring an intermediate biometric from the second imagery;
comparing the intermediate biometric acquired from the first imagery with the intermediate biometric acquired from the second imagery to determine a degree of match between the intermediate biometric acquired from the first imagery and the intermediate biometric acquired from the second imagery; and
when the degree of match between the intermediate biometric acquired from the first imagery and the intermediate biometric acquired from the second imagery exceeds a threshold degree of match:
making a first determination that the first biometric is bound to the second biometric; and
issuing an indication that the first biometric is bound to the second biometric.

31. A system comprising:
a memory for storing computer-readable instructions; and
a processor connected to the memory, wherein the processor, when executing the computer-readable instructions, causes the system to perform a method of binding a first biometric to a second biometric, the method comprising:
acquiring the first biometric;
capturing first physiological signals in conjunction with acquisition of the first biometric;
acquiring the second biometric;
capturing second physiological signals in conjunction with acquisition of the second biometric;
comparing the first physiological signals and the second physiological signals to determine a degree of match between the first physiological signals and the second physiological signals; and
when the degree of match between the first physiological signals and the second physiological signals exceeds a threshold degree of match:
making a first determination that the first biometric is bound to the second biometric; and
issuing an indication that the first biometric is bound to the second biometric.

32. A system comprising:
a memory for storing computer-readable instructions; and
a processor connected to the memory, wherein the processor, when executing the computer-readable instructions, causes the system to perform a method of binding a first biometric to a second biometric, the method comprising:
capturing first imagery;
acquiring a first biometric from the first imagery;
acquiring an intermediate biometric from the first imagery;
capturing second imagery;
acquiring an intermediate biometric from the second imagery;
comparing the intermediate biometric acquired from the first imagery with the intermediate biometric acquired from the second imagery to determine a degree of match between the intermediate biometric acquired from the first imagery and the intermediate biometric acquired from the second imagery; and
when the degree of match between the intermediate biometric acquired from the first imagery and the intermediate biometric acquired from the second imagery exceeds a threshold degree of match:
making a first determination that the first biometric is bound to the second biometric; and issuing an indication that the first biometric is bound
  to the second biometric.

* * * * *